(12) United States Patent
Tsai et al.

(10) Patent No.: US 6,723,443 B2
(45) Date of Patent: Apr. 20, 2004

(54) NYLON POLYMER BLENDS AND FILMS MADE THEREFROM

(75) Inventors: Mingliang L. Tsai, Holmdel, NJ (US); Murali K. Akkapeddi, Morristown, NJ (US); Clark V. Brown, White Plains, NY (US); Darnell C. Worley, II, Phillipsburg, NJ (US)

(73) Assignee: Honeywell International Inc., Morristown, NJ (US)

( * ) Notice: Subject to any disclaimer, the term of this patent is extended or adjusted under 35 U.S.C. 154(b) by 91 days.

(21) Appl. No.: 09/990,222

(22) Filed: Nov. 21, 2001

(65) Prior Publication Data

US 2003/0104218 A1 Jun. 5, 2003

(51) Int. Cl.[7] .......................... C08L 77/00; B32B 27/08
(52) U.S. Cl. .................... 428/475.5; 524/394; 524/445; 525/66; 525/179; 525/423
(58) Field of Search .......................... 525/423, 66, 179; 428/475.5; 524/394, 445

(56) References Cited

U.S. PATENT DOCUMENTS

| | | | |
|---|---|---|---|
| 5,275,853 A | 1/1994 | Silvis et al. ............... | 428/35.4 |
| 5,731,094 A | 3/1998 | Brennan et al. ......... | 428/474.4 |
| 6,011,111 A | * 1/2000 | Brennan et al. ............ | 524/601 |

OTHER PUBLICATIONS

H. Craig Silvis, "Recent Advances in Polymers for Barrier Applications", TRIP vol. 5, No. 3, Mar. 1997, pp. 75–79.
David J. Brennan, et al., "Amorphous Phenoxy Thermoplastics with an Exgtraordinary Barrier to Oxygen", 1995 American Chemical Society, Macromolecules 1995, vol. 23, No. 19, 1995.
Terry Glass, et al., "New Thermoplastic Adhesive and Barrier Resins", ANTEC 2000, pp. 1813–1817.
G. Guerrica–Echevarria, et al., "Phase Behavior and Physical Properties of Injection–Molded Polyamide 6/Phenoxy Blends", XP–000804526, Journal of Applied Polymer Science, vol. 72, pp. 1113–1124, 1999.

* cited by examiner

*Primary Examiner*—Ana Woodward
(74) *Attorney, Agent, or Firm*—Roger H. Criss; Margaret S. Millikin

(57) ABSTRACT

This invention relates to blends of nylon homopolymers and copolymers with poly(hydroxyamino ether) polymers. More particularly, there are provided blends of nylon 6 and its copolymers with poly(hydroxyamino ether) which form films having high miscibility, high clarity and good processability.

48 Claims, No Drawings

NYLON POLYMER BLENDS AND FILMS MADE THEREFROM

BACKGROUND OF THE INVENTION

1. Field of the Invention

The invention relates to blends of nylon homopolymers and copolymers with certain other polymers. More particularly, the invention pertains to blends of nylon 6 and its copolymers with certain other polymers useful to form films having high miscibility, high clarity and good processability.

2. Description of the Prior Art

It is well known that miscibility of polymer-polymer blends is very rare. This is because most polymer pairs with dissimilar structures invariably form phase-separated immiscible blends due primarily to the unfavorable intersegmental incompatibility. It is also known that nylons are especially incompatible and immiscible with other polymers due to a hydrogen bonded polyamide backbone. Only a limited type of amorphous nylons having a polyamide backbone are known to exhibit some degree of miscibility with other nylons having a similar polyamide backbone, for example nylon 6I/6T with nylon 6.

It would be desirable to provide blends of nylons with other polymers, preferably blends which are miscible.

SUMMARY OF THE INVENTION

The invention provides a polymeric composition comprising a blend of at least one polyamide component and at least one poly(hydroxyamino ether) component.

The invention also provides a polymeric film formed from a polymeric composition comprising a blend of at least one polyamide component and at least one poly(hydroxyamino ether) component.

The polymer composition also preferably includes an oxygen scavenger composition, such as an oxidizable polydiene, and a metal salt catalyst, such as a metal carboxylate salt. It is also desired that polymer compositions of this invention comprise a nanometer scale dispersed platelet type clay to further augment their barrier and oxygen scavenging properties. Such clays are normally referred to as nanoclays and they are normally composed of organo-ammonium cation exchanged montmorillonite or hectorite type smectitic clays.

The invention further provides a polymeric film formed from a polymeric composition comprising a blend of at least one polyamide component, at least one poly(hydroxyamino ether) component, optionally at least one platelet type organoclay in nanometer scale fine dispersion, and optionally at least one oxidizable polydiene, or at least one metal salt catalyst, or both.

The invention still further provides shaped articles formed from the compositions of the invention.

It has unexpectedly been found that nylon 6 and its copolymers form very homogenous, miscible blends when melt compounded with poly(hydroxyamino ether) polymers, combining the advantages of both polymers. Particularly, poly(hydroxyamino ether) polymers, such as those described in U.S. Pat. No. 5,731,094, are known to exhibit good oxygen and carbon dioxide gas barrier properties, but have poor melt processability and poor heat resistance due to lack of crystallinity, and exhibit low Tg. On the other hand, nylons are known to have poor gas barrier properties, but good melt processability and heat resistance. This miscible blend has been found to substantially improve the gas barrier properties of nylon, particularly at high humidity levels, while retaining good melt processability. Films formed from such blends also exhibit high clarity and a reduced or controlled nylon crystallization rate, which is particularly beneficial for in blown film processing, coinjection stretch blowmolding and large-diameter monofilament spinning.

DETAILED DESCRIPTION OF THE PREFERRED EMBODIMENTS

The polymeric composition of the claimed invention relates most broadly to blends of nylon homopolymers and/or nylon copolymers with poly(hydroxyamino ether) polymers. Poly(hydroxyamino ether) polymers are epoxy-based thermoplastics produced through the reaction of liquid epoxy compounds and primary amines. They exhibit excellent barrier properties to atmospheric gases, good optical clarity, good adhesion to a variety of substrates, as well as good melt strength and mechanical behavior. The poly(hydroxyamino ether) polymers useful herein are described by the following formula:

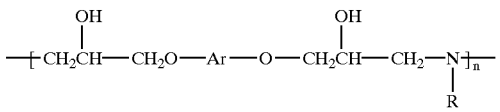

wherein Ar=p- or m-phenylene; alkyl substituted p- or m-phenylene; 4,4'-isopropylidene-bis-phenylene; or 4,4'-oxy-bis-phenylene;

R=alkyl; ω-hydroxyalkyl; aryl; o-, m- or p-hydroxyaryl ω-hydroxy-(polyalkyleneoxy) alkyl; or ω-alkoxy-(polyalkyleneoxy ) alkyl;

and n is an integer from about 5 to about 1000.

A preferred poly(hydroxyamino ether) is derived from a 1:1 polyaddition reaction of an aryldiglycidyl ether and monoethanolamine, represented by the formula:

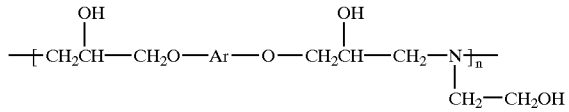

wherein Ar=p- or m-phenylene; alkyl substituted p- or m-phenylene; 4,4'-isopropylidene-bis-phenylene; or 4,4'-oxy-bis-phenylene;

and n is an integer from about 5 to about 1000.

Another preferred poly(hydroxyamino ether) component comprises a polyadduct of monoethanolamine with resorcinol diglycidyl ether or bisphenol A-diglycidyl ether or a combination thereof. Other useful poly(hydroxyamino ether) polymers may be found in U.S. Pat. Nos. 5,275,853 and 5,731,094.

Blended together with the poly(hydroxyamino ether) polymers are nylon homopolymers and/or nylon copolymers. Suitable nylons within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula:

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula:

$H_2N(CH_2)_nNH_2$ wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Aliphatic polyamides used in the practice of this invention may be obtained from commercial sources or prepared in accordance with known preparative techniques. For example, nylon 6 can be obtained from Honeywell International Inc., Morristown, N.J. under the trademark CAPRON®.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), polyhexamethylene terephthalamide (nylon 6,T), poly (dodecamethylene terephthalamide), polyamide 6I/6T, polyamide 6/MXDT/I, polyamide MXDI, polyamide MXDT, polyamide MXDI/T, polyhexamethylene naphthalene dicarboxylate (nylon 6/6N), polyamide 6N/6I, polyamide MXDT/MXDI and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267.

Preferred polyamides include nylon 6, nylon 6,6, nylon 6/66, nylon 66/6, nylon 6I/6T, nylon MXDI/T, as well as mixtures of the same. Of these, nylon 6 is most preferred, alone or in combination with nylon 6/66.

In the preferred embodiment of the invention, the polyamide component comprises from about 1% to about 99% by weight of the blend, more preferably from about 30% to about 95% by weight of the blend and most preferably from about 60% to about 90% by weight of the blend. In the preferred embodiment of the invention, the poly (hydroxyamino ether) component comprises from about 1% to about 99% by weight of the blend, more preferably from about 5% to about 70% by weight of the blend and most preferably from about 10% to 40% by weight of the blend.

The polymer composition of the invention also preferably contains at least one functional, oxidizable polydiene which serves as an oxygen scavenger, which is preferably dispersed as small particles which are compatible with and substantially uniformly distributed throughout the polymer composition. It must be noted that the nylon/polyhydroxyether polymer blend itself is not oxidizable under the ambient conditions of use of these materials as barrier packaging articles. Hence an oxidizable polydiene is used as the oxygen scavenger in the compositions of this invention. Preferably the oxidizable polydiene comprises an anhydride or epoxy functionality such that it reacts with the amine end group of the nylon used or the hydroxyl groups on the polyhydroxyamino ether used in the blend. Preferred functional polydienes include functional polyalkadiene oligomers which can have the following general structure:

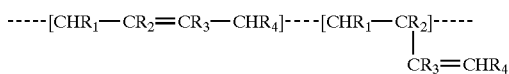

where $R_1$, $R_2$, $R_3$ and $R_4$ can be the same or different and can be selected from hydrogen (—H) or any of the lower alkyl groups (methyl, ethyl, propyl, butyl, etc.). Illustrative of the backbone structure are polybutadiene (1,4 or 1,2 or mixtures of both), polyisoprene (1,4 or 3,4), poly 2,3-dimethyl butadiene, polyallene, poly 1,6-hexatriene, epoxy functionalized, maleic anhydride grafted or copolymerized polybutadiene (1,4 and/or 1,2), epoxy functionalized polyisoprene, and maleic anhydride grafted or copolymerized polyisoprene.

A preferred oxygen scavenger includes a polybutadiene, particularly an epoxy or anhydride functional polybutadiene oligomer. The oxygen scavenger is preferably present in the polymer composition as a large number of small particles. The molecular weight of the functional polydiene oligomer preferably ranges from about 500 about to 10,000, preferably from about 750 to about 3000 and most preferably from about 1000 to about 2000. If included, it is preferably present in the overall composition in an amount of from about 0.1% to about 10% by weight, more preferably from about 1% to about 10% and most preferably from about 2% to about 5%. The functional, oxidizable polydiene is preferably present in the form of particles whose average particle size is in the range of from about 10 nm to about 5000 nm, and wherein the particles are substantially uniformly distributed throughout the polymer composition.

The polymer composition also preferably further comprises a metal salt catalyst such as a metal carboxylate salt catalyst. Suitable metal carboxylate salt catalysts have a counterion which is an acetate, stearate, propionate, hexanoate, octanoate, benzoate, salicylate, cinnamate, and combinations thereof. Preferably the metal carboxylate salt catalyst is a cobalt, copper or ruthenium, acetate, stearate, propionate, hexanoate, octanoate, benzoate, salicylate or cinnamate, or combinations thereof. The preferred metal carboxylate is cobalt, ruthenium or copper carboxylate. Of these the more preferred is a cobalt, such as cobalt stearate, or copper carboxylate and the most preferred is cobalt carboxylate. If included, it is present in the overall composition in an amount of from about 0% to about 1% by weight, preferably from about 0.001% to about 0.5% and more preferably from about 0.005% to about 0.1%. The most preferred range is from about 0.01% to about 0.05%.

In the preferred embodiment of the invention, the composition further comprises at least one optional platelet type organoclay in nanometer scale fine dispersion, known in the art as a nanoclay. Suitable clays are described in U.S. Pat. No. 5,747,560, which is incorporated herein by reference. Preferred clays non-exclusively include a natural or synthetic phyllosilicate such as montmorillonite, hectorite, vermiculite, beidilite, saponite, nontronite or synthetic flouromica, which has been cation exchanged with a suitable organoammonium salt. The preferred clay is montmorillonite, hectorite or synthetic flouromica. The more preferred clay is the montmorillonite or hectorite. The most preferred clays are alkylammonium-complexed montmorillonite nanoclay and 12-aminododecanoic acid-complexed montmorillonite nanoclay. The preferred organoammonium cation for treating the clay is N,N',N",N'" Bis(hydroxyethyl), methyl, octadecyl ammonium cation or ω-carboxy alkylammonium cation, i.e., the ammonium cation derived such ω-aminoalkanoic acids as 6-aminocaproic acid, 11-aminoundecanoic acid, 12-aminododecanoic acid. The preferred fine dispersions of nanometer scale silicate platelets are obtained either via an in-situ polymerization of polyamide forming monomer(s) or via melt compounding of polyamide in the presence of the organoammonium salt treated clay. The clay has an average platelet thickness in the range of from about 1 nm to about 100 nm and an average length and average width each in the range of from about 50 nm to about 500 nm. If included, it is present in the overall composition in an amount of from about 0% to about 10% by weight, preferably from about 2% to about 8% and more preferably from about 3% to about 6%.

In the preferred embodiment of the invention, the polymeric composition includes both at least one oxidizable polydiene and at least one metal salt catalyst, and also a platelet type nanoclay.

The composition of the invention may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators, plasticizers, as well as other conventional additives known to the art. Such may be used in amounts of up to about 10% by weight of the overall composition.

Suitable ultraviolet light stabilizers include various substituted resorcinols, salicylates, benzotriazole, benzophenones, and the like. Suitable lubricants and mold release agents include stearic acid, stearyl alcohol, and stearamides. Suitable flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Periodic Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Suitable plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

Suitable fillers and extenders include fine particle size (0.01 μm to 10 μm) inorganic fillers, including those of platelet or granular nature, as wells as mixtures thereof. The more preferred particle sizes are in the range of 0.05 μm–5 μm. The most preferred particle size is in the range of 0.1 μm–1 μm. These fillers include mica, clay, kaolin, bentonite, and silicates, including alumina silicate. Other fine particle fillers include metal oxides, such as alumina, silica, magnesium oxide, zirconium oxide, titanium oxide. Other fine particle size include carbonates such as calcium carbonate, magnesium carbonate, and dolomite, sulfates including calcium sulfate and barium sulfate, as well as other materials not specifically denoted here.

Preferably the polymer compositions are produced via a melt extrusion compounding of the ethylene vinyl alcohol copolymer with the other composition components. The composition may be formed by dry blending solid particles or pellets of each of the composition components and then melt blending the mixture in a suitable mixing means such as an extruder, a roll mixer or the like. Typical melting temperatures range from about 210° C. to about 290° C., preferably from about 220° C. to about 280° C. and more preferably from about 230° C. to about 260° C. for the nylon blends. Blending is conducted for a period of time required to attain a substantially uniform blend. Such may easily be determined by those skilled in the art. If desired, the composition may be cooled and cut into pellets for further processing, it may be extruded into a fiber, a filament, or a shaped element or it may be formed into films and optionally uniaxially or biaxially stretched by means well known in the art.

Barrier films and articles of this invention may be produced by any of the conventional methods of producing films and articles, including extrusion and blown film techniques, bottles via extrusion or injection stretch blow molding and containers via thermoforming techniques. Processing techniques for making films, sheets, tubes, pipes, containers and bottles are well known in the art. For example, the polymer components may be preblended and then the blend fed into an infeed hopper of an extruder, or each component may be fed into infeed hoppers of an extruder and then blended in the extruder. The melted and plasticated stream from the extruder is fed into a single manifold die and extruded into a layer. It then emerges from the die as a single layer film. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Once cooled and hardened, the result film is preferably substantially transparent.

Alternatively the composition may be formed into a film using a conventional blown film apparatus. The film forming apparatus may be one which is referred to in the art as a "blown film" apparatus and includes a circular die head for bubble blown film through which the plasticized film composition is forced and formed into a film "bubble". The "bubble" is ultimately collapsed and formed into a film.

The compositions of the invention may also be used to form shaped articles through any well known process, including extrusion blow molding and injection stretch-blow molding. An injection molding process softens the composition in a heated cylinder, injecting it while molten under high pressure into a closed mold, cooling the mold to induce solidification, and ejecting the molded preform from the mold. Molding compositions are well suited for the production of preforms and subsequent reheat stretch-blow molding of these preforms into the final bottle shapes having the desired properties. The injection molded preform is heated to suitable orientation temperature in the 100° C.–150° C. range and then stretch-blow molded. The latter process consists of first stretching the hot preform in the axial direction by mechanical means such as by pushing with a core rod insert followed by blowing high pressure air (up to 500 psi) to stretch in the hoop direction. In this manner, a biaxially oriented blown bottle is made. Typical blow-up ratios range from 5/1 to 15/1.

Multilayered barrier articles of this invention can be formed by any conventional technique for forming films, including lamination, extrusion lamination, coinjection, stretch-blow molding and coextrusion blowmolding. The preferred method for making multilayer film is by coextrusion. For example, the material for the individual layers, as well as any optional layers, are fed into infeed hoppers of the extruders of like number, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Alternatively the individual layers may first be formed into sheets and then laminated together under heat and pressure with or without intermediate adhesive layers.

Optionally, an adhesive layer, also known in the art as a "tie" layer, may be placed between each film layer. In accordance with the present invention, suitable adhesive polymers include modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878. Alternatively, one or more adhesive polymers may be directly blended or coextruded into other layers of the film, thus providing adhesion while minimizing the number of layers in the film.

Films produced according to the present invention may be oriented by stretching or drawing the films at draw ratios of from about 1.1:1 to about 10:1 in at least one direction, and preferably at a draw ratio of from about 1.5 to about 5 times in each in at least one direction. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

Such films may be stretched or oriented in any desired direction using methods well known to those skilled in the art. The film may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction.

The thickness of such films according to the invention preferably ranges from about 0.05 mils (1.3 $\mu$m) to about 100 mils (2540 $\mu$m), and more preferably from about 0.05 mils (1.3 $\mu$m) to about 50 mils (1270 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

One noteworthy characteristic of the articles made from the compositions of this invention is that they exhibit excellent gas barrier properties, particularly oxygen barrier properties. Oxygen permeation resistance or barrier may be measured using the procedure of ASTM D-3985. In general, the films of this invention have an oxygen transmission rate (OTR) at 90% relative humidity (RH) of less than about 5.0 $cm^3/100$ $in^2$ (645 $cm^2$)/24 hrs/Atm at 25° C. using 100% oxygen, and preferably less than about 1 $cm^3/100$ $in^2$ (645 $cm^2$)/24 hrs/Atm at 25° C.

The following non-limiting examples serve to illustrate the invention. It will be appreciated that variations in proportions and alternatives in elements of the components of the invention will be apparent to those skilled in the art and are within the scope of the present invention. The examples include description of the blending processes used and analytical characterization methods employed.

EXAMPLES

Processing Methods
Process A (Pellet Blending)

Pellet blending was accomplished by weighing out known amounts of nylon pellets and the polyhydroxyamino ether resin pellets into a large container. The container was tumbled for several minutes to ensure thorough mixing of the two components. These blends were used subsequently as feedstock for direct extrusion of the films (Process B) or melt compounding into extruded strands and pelletizing (Process C).

Process B (Direct Film Extrusion From a Pellet Blend of Component Resins)

A Haake 0.75 inch (18 mm) single screw extruder equipped with a six-inch (152.4 mm) wide slit film die was flood fed with a pellet/pellet blend of known weight ratio of nylon and polyhydroxyamino ether made from process A. The extruder temperature profile was set at a range of 230° C. to 260° C. The melt extrudate passed through the film die and the film cast onto a Killion cast roll, the temperature of which was controlled by water cooling to 100° F. Film thickness was adjusted via cast roll speed and/or screw speed (RPM) to prepare a film with typical thickness of 0.001 inch to 0.002 inch (0.0254 to 0.0508 mm).

Process C (Melt Compounding of the Blend in a Twin-Screw Extruder)

A Leistritz 18-mm co-rotating twin screw extruder equipped with a K-Tron volumetric feeder was employed. A pellet blend of nylon and polyhydroxyamino ether made by process A, was fed into the nitrogen-blanketed throat of the extruder at a rate of 10 pounds (4.5 kg) per hour. The extruder was equipped with two mixing zones consisting primarily of kneading elements and six heating zones. Zone 1 was kept at 190° C. and zones 2–6 in the range of 230° C. to 260° C. The molten extrudate was quenched in a water bath and the solidified strands were cut into pellets on-line using a continuous pelletizer.

Process D (Casting of a Film From a Pre-Compounded Blend)

A Haake 0.75 inch (18 mm) single screw extruder equipped with a six-inch (152.4 mm) wide film die was flood fed with the melt-compounded blend pellets from process C. The film extruder temperature was set at approximately 230–260° C. The extrudate passed through the slit die and the film was cast onto a Killion cast roll maintained at 100° F. The film thickness was adjusted via the cast roll speed and/or screw RPM to prepare a film with typical thickness of 0.001 inch to 0.002 inch (0.0254 to 0.0508 mm).

Process E (Melt Compounding of the Oxygen Scavenging Blend Compositions)
Step 1

A Leistritz 18-mm co-rotating twin screw extruder equipped with a K-Tron volumetric feeder was employed. A 95/5 (w/w) blend of the polyhydroxyamino ether pellets and cobalt stearate pastilles was fed into the nitrogen-blanketed throat of the extruder at a rate of 10 pounds (4.5 kg) per hour. The extrusion was done with zone 1 at 185° C. and zones 2–6 at 220° C., while the screw speed was maintained at 100 rpm. Mixing was accomplished in the zones containing kneading elements. The extrudate was quenched in a water bath and then pelletized. The resulting cobalt stearate masterbatch was used as an additive in the following subsequent blending operations.

Step 2

Pellet blending was accomplished by weighing into a large container the required amounts of nylon, polyhydroxyamino ether resin and the cobalt stearate masterbatch (from step #1) in a known weight ratio (typically 47/47/2.5) and then tumbling the container for several minutes to ensure thorough mixing of the three components. These pellet blends were used as feedstock for the subsequent extruder melt compounding step #3.

Step 3

A Leistritz 18-mm co-rotating twin screw extruder equipped with a K-Tron volumetric feeder and a Leistritz direct liquid injection nozzle was employed. A pellet blend of nylon, polyhydroxyamino ether and cobalt stearate masterbatch, typically in a 47/47/2.5 weight ratio made by step #2 was fed into the nitrogen-blanketed throat of the extruder at a rate of 10 pounds (4.5 kg) per hour, while simultaneously injecting a liquid, maleic anhydride functionalized polybutadiene (Ricon 131MA5, Sartomer) which was metered with a Nichols-Zenith pump directly into the sealed extruder barrel zone following the feed throat and just prior to the first mixing barrel zone. The pumping rate of the functional polybutadiene was controlled such that about 3.5 wt % polybutadiene was added into the total blend composition. The mixing zones in the extruder consisting primarily of kneading elements provided the intimate mixing needed in making this reactive blend. The resulting well-mixed blend extrudate was then quenched in a water bath and pelletized as usual.

Oxygen Transmission Rate Measurements

The oxygen transmission rate (OTR) measurements were conducted on a Mocon Oxtran apparatus equipped with SL sensors. Tests were conducted on film samples at 80% to 90% relative humidity and 25° C. in pure oxygen. Data was collected as a function of time and until it reached the steady state in approximately 18 hours. When the sample contained oxygen scavenger additives, the scavenging action took several days to complete and reach the steady-state. All the transmission rate data was recorded in units of: cc-mil/100 $in^2$/day.atm.

Thermal Characterization

Differential Scanning Calorimetry (DSC) measurements of crystallization temperatures (Tcc) on the samples were done by first heating the samples in the DSC pan to above the sample's melting point, holding in the melt at 250° C. for 10 minutes and then cooling at a constant rate of 10° C./min or 20° C./min. The crystallization temperature was recorded as an exothermic peak. Glass transition temperature (Tg) was measured by first heating the virgin sample to above its melting point, quenching the melt in liquid nitrogen and then reheating the quenched samples at a constant heating rate of 10° C./min to measure the onset of glass transition temperature. The melting endotherm during this reheat cycle was also recorded as the melting point (Tm° C.) of the blend sample.

Listed in the Table 1 are the summarized results obtained from the following examples which illustrate the effect of blending various types of nylons with polyhydroxyaminoether resin on the thermal and oxygen barrier properties of the resultant films and their miscibility or phase behavior in microscopy analysis

Control Examples 1–10

Control examples 1–10 are the neat (100%) individual component resins cast as films for the purpose of comparing the properties against the various blend examples which will be described later.

Control example 1 is a nylon 6/66 (85/15) copolymer (Capron® CA73, Honeywell) with a formic acid viscosity (FAV) of 73 (designated PA6/66 in Table 1).

Control example 2 is a polyhydroxyaminoether (Blox® 4000) available from Dow Chemical, designated PHAE-I in Table 1. It is believed to be a copolymer containing both Bisphenol A and resorcinol moieties in roughly 60/40 mole ratio.

Control example 3 is a nylon 6 nanocomposite (PA6/NC-I) from Honeywell with about 4% nanoclay, finely dispersed in nanometer-scale via an in situ polymerization of nylon 6 in the presence of an organoclay.

Control example 4 is a nylon 6 homopolymer of FAV=73 from Honeywell, designated PA6 in Table 1.

Control example 5 is a nylon 6 nanocomposite (PA6/NC-II) from Honeywell with about 2% nanoclay finely dispersed in nanometer-scale via an in situ polymerization of nylon 6 in the presence of an organoclay, designated as PA6/NC-II in Table 1.

Control example 6 is a PA 6I/6T copolymer, an amorphous, semi-aromatic nylon with a glass transition temperature (Tg) of ca. 127° C. (Selar PA 2072) from Dupont.

Control example 7 is a PA66 polymer (Zytel® 101) from Dupont.

Control example 8 is a PA12 (Rilsan® A) from Atofina.

Control example 9 is a PA-MXD6 (grade 6001) from Mitsubishi Gas Chemical.

Control example 10 is a polyhydroxyaminoether resin (Blox® 5000) from Dow Chemical, designated PHAE-II in Table 1. It is believed to be a copolymer containing both Bisphenol A and resorcinol moieties in roughly 50/50 mole ratio.

Examples 1–3

Examples 1–3 illustrate the method of melt blending and extrusion of the blend compositions directly into films starting from the pellet blends of the nylon and the polyhydroxyamino ether resins, using a combination of Process A & Process B described above. The compositions and properties of the blend films are summarized in Table 1. In Examples 1 and 2, the nylon used was the same as in Control example 1 and the polyhydroxyamino ether resin used was the same as in Control example 2, with blend ratios of 70/30 and 50/50, respectively. In Example 3, the nylon was the same as in Control example 3 (PA6/NC-I) and the polyhydroxyamino ether resin was the same as in Control example 2, used in a 70/30 blend ratio. All of the above three blends exhibited unexpectedly good miscibility at the molecular level as evidenced by a single phase matrix morphology (no dispersed polymer domains) in optical and transmission electron microscopy. The DSC data also confirmed the miscibility in the blend as evidenced by (a) a substantial depression (>20° C.) of the crystallization temperature (Tcc) upon cooling from melt at 20° C./min cooling rate and (b) a significant depression ($\geqq$5° C.) in the melting point of the nylon components compared to the neat nylon Control examples 1 and 3. The oxygen barrier properties of the blend films from Examples 1–3 were found to be superior (lower OTR) compared to the nylon Control examples 1 & 3.

Examples 4–7

Examples 4–7 illustrate the various blend compositions made from a nylon 6 homopolymer (PA6) (as in Control example 4) and the polyhydroxyamino ether of Control example 2), in the blend ratios of 90/10, 80/20, 70/30, 50/50 respectively. The blends were made by first making in each case, a pellet-pellet blend (Process A) which was then melt compounded in a Leistritz 18 mm twin-screw extruder at 230° C.–260° C. and pelletized at a throughput rate of 10 lbs (4.5 Kg)/h (Process C). The blend pellets were then reextruded at 230° C.–250° C. on a Haake 18 mm single screw extruder equipped with a six-inch (152.4 mm) film die and cast onto a Killion cast roll into 0.001 to 0.002 inch (0.0254 to 0.0508 mm) thick uniform films (Process E).

Table 1 contains the DSC and OTR data on these blend films. The observed depression of up to 25° C. in the crystallization temperatures (Tcc) of these blends upon cooling from melt, lends further support for the blend miscibility. The blends showed improved OTR values @ 90%RH compared to the PA6 control (control Example 4) namely about 1.5–3.3 cc.mil/100 in$^2$-day-atm for the blends vs 8 cc.mil/100 in$^2$-day-atm for the PA6 control.

Examples 8 and 9

Examples 8 and 9 illustrate the blends of nylon 6 nanocomposite (PA6/NC-II, with about 2% nanoclay) and the polyhydroxyamino ether of Control example 2. They were prepared by first melt compounding a pellet blend in a Leistritz 18 mm twin screw extruder (Process A & C) followed by reextruding the blend pellets into a film using a Haake film extruder (Process D). The blend ratios in Examples 8 and 9 were 70/30 and 50/50 respectively. Microscopy indicated a single polymer phase (except for the nanometer scale clay dispersion). The DSC crystallization temperature upon cooling from melt (Tcc) was suppressed by about 12 to 22° C. and the nylon melting point was suppressed by 7 to 22° C. compared to the neat nylon 6 nanocomposite (Control example 5) indicative of the miscibility effects.

Examples 10 and 11

Examples 10 and 11 illustrate the blends of an amorphous semi-aromatic nylon, PA6I/6T copolymer (amorphous nylon Selar PA2420 from Dupont) and the polyhydroxyamino ether of Control example 2. They were prepared by first melt compounding a pellet blend in a Leistritz 18 mm twin screw extruder (Process A & C) at 260° C. followed by the reextrusion of the blend pellets into a film using a Haake film extruder (Process D). The blend ratios in Examples 10 and 11 were 80/20 and 70/30 respectively. Optical microscopy indicated a two-phase morphology with the amorphous nylon as the matrix phase and a dispersion of PHAE as an immiscible dispersed phase.

The DSC data on the blend sample (Table 1) in both Example 8 and 9 indicated two essentially unchanged glass transition temperatures for each of the polymer components, namely one at 68° C. for the PHAE phase and one at 126° C. for the amorphous nylon matrix phase. This confirmed the lack of miscibility in these type of blends containing amorphous nylons.

Examples 12 and 13

Examples 12 and 13 illustrate the preparation of PA6/PHAE and PA6 nanocomposite/PHAE as 50/50 blends further comprising about 3.5% of a maleic anhydride functionalized liquid polybutadiene (Manh-g-PBD) as an oxygen-scavenging additive (Ricon® 13-5MA from Sartomer/Atofina, molecular weight of 2000) and cobalt stearate as an oxygen-scavenging catalyst. In both examples the oxygen binding, maleic anhydride functionalized polybutadiene is very finely dispersed particles of 10–500 nm size reactively bonded to the matrix phase comprising of a miscible single phase of PA6/PHAE blend. In Example 13, there is additionally present about 1% nanoclay. The miscibility in the matrix phase was confirmed by the DSC data on Tcc & Tm both indicating substantial depression in the crystallization temperature (Tcc) and melting point as in Example 7 and 9 respectively. Both these examples illustrate the compositions exhibiting dramatic improvement in oxygen binding ability of the miscible nylon/PHAE blends.

Example 14

Example 14 illustrates a 70/30 weight ratio blend of the nylon 66 homopolymer of Control example 7 and the polyhydroxyamino ether of Control example 2. They were prepared by first pellet/pellet blending followed by melt compounding the blend on a Leistritz 18 mm twin screw extruder (see Process A & C) at 280° C. Optical microscopy indicated the blend to have an essentially uniform morphology, although an ultra-fine phase separation was evident. DSC indicates no significant change in Tcc but a small depression in melting point.

Example 15

Example 15 illustrates a 70/30 weight ratio blend of the nylon 12 homopolymer of Control example 8 and the polyhydroxyamino ether of Control example 2. They were prepared by first pellet/pellet blending followed by the melt compounding of the blend on a Leistritz 18 mm twin screw extruder (see Process A & C) at 220° C. Optical microscopy of the blend indicated an immiscible 2-phase morphology. DSC indicates no change in melting point or crystallization temperature (Tcc) supportive of the immiscible nature of the blend.

Example 16

Example 16 illustrates a 70/30 weight ratio blend of the nylon MXD6 homopolymer of Control example 9 and the polyhydroxyamino ether grade of Control example 2. They were prepared by first pellet/pellet blending followed by the melt compounding of the blend on a Leistritz 18 mm twin screw extruder (see Process A & C) at 260° C. Optical microscopy of the blend showed a 2-phase morphology, indicative of immiscibility or at best only a limited partial miscibility. DSC indicates no crystallization temperature (Tcc) as was also the case with the PA-MXD6 control, due to the intrinsically slow crystallization behavior of PA-MXD6. Melting of the blend was 229° C. compared to 235° C. for the PA-MXD6 control, indicative of some partial miscibility accounting for the melting point depression.

Examples 17–19

Examples 17 to 19 are nylon blends based on the polyhydroxyaminoether of Control example 10, which has a higher content of resorcinol moiety and exhibits high gas barrier properties. Examples 17 illustrates a blend composition made from the nylon 6 homopolymer of Control example 4 and the polyhydroxyamino ether of Control example 10, in a blend ratio of 70/30 by weight. A pellet-pellet blend was made first (Process A) which was then melt compounded in a Leistritz 18 mm twin-screw extruder at 230° C.–260° C. and pelletized at a throughput rate of 10 lbs (4.5 Kg)/h (Process C). The blend pellets were then reextruded at 230° C.–250° C. on a Haake 18 mm single screw extruder equipped with a six-inch (152.4 mm) film die and cast onto a Killion cast roll into 0.001 to 0.002 inch (0.0254 to 0.0508 mm) thick uniform films (Process E).

Example 18 is a blend of nylon 6 nanocomposite with about 2% nanoclay (PA6/NC-II) and PHAE-II in a 70/30 weight ratio prepared as above. Example 19 is a blend of nylon 6 nanocomposite with about 4% nanoclay (PA6/NC-I) and PHAE-II in a 70/30 weight ratio, prepared as above.

Table 1 contains the DSC and OTR data on these blend films. The observed depression of up to 25° C. in the crystallization temperatures (Tcc) of these blends upon cooling from melt, lends further support for the blend miscibility. The blends showed improved OTR values @ 90% RH relative to the PA6 control (Control example 4) namely about 1.5–3.3 cc.mil/100 in$^2$-day-atm vs 8 cc.mil/100 in$^2$-day-atm.

From the foregoing blend examples it is apparent that when the polyamide is a nylon 6 homopolymer (Examples 4–7, 12 & 17) or a nylon 6 nanocomposite (Examples 3, 8, 9, 13, 18 & 19) or a nylon 6/66 copolymer (Examples 1 and 2), all the corresponding blends with polyhydroxyaminoethers (PHAE-I & II) are miscible single phase blends as confirmed by microscopy (optical & TEM) and DSC data indicating significant suppression of crystallization temperature (Tcc) and melting points. The blends show substantially improved oxygen barrier properties compared to the corresponding nylon 6 polymer.

In contrast the PHAE blends with all other polyamides such as nylon 66 (Example 14), amorphous nylon PA6I/6T (Examples 10–11), nylon 12 (Example 15) and the semiaromatic nylon PA-MXD6 (Example 16), form essentially immiscible blends as evidenced by microscopy (2-phase morphology) and the DSC data indicating no major effect on the crystallization temperature (Tcc) and melting points.

In particular, it can be seen that the results corroborating the miscibility between polyhydroxyamino ether polymers and nylon 6 or its derivatives such as nylon 6 nanocomposites and nylon 6 copolymers, are unexpected and are of particular practical value in such applications as monolayer or multilayer films, bottles (coinjection molded or coextruded), tubing, extrusion coating, jacketing and monofilaments, wherein the blends exhibit improved barrier and mechanical properties and processability.

TABLE 1

Compositions and properties of Nylon/Polyhydroxyamino ether blends (Cast films-ca. 25 μ thickness)

| Example | Process | Blend composition (wt. %) | Tg (° C.) | Tcc (° C.) | Tm (° C.) | Morphology[1] | OTR (cc.mil/ 100 in² day) @ 90% RH |
|---|---|---|---|---|---|---|---|
| Control 1 | B | PA6/66 (100) | 50 | 147 | 195 | Single phase | 10 |
| Control 2 | B | PHAE-I (100) | 69 | — | | Single phase | 0.9 |
| 1 | A & B | PA6/66 (70); PHAE-I (30) | | 125 | 187 | Single phase (miscible) | 5.3 |
| 2 | A & B | PA6/66 (50); PHAE-I (50) | | | | Single phase | 3.9 |
| Control 3 | B | PA6/NC-I[6] (100) | 50 | 178 | 213 | Single phase | 2 |
| 3 | A & B | PA6/NC-I (70); PHAE-I (30) | | 154 | 208 | Single phase | 1.8 |
| Control 4 | B | PA6 (100) | 50 | 181 | 221 | Single phase | 8 |
| 4 | A, C & D | PA6 (90); PHAE-I (10) | | 178 | 214 | Single phase | 3.3 |
| 5 | A, C & D | PA6 (80); PHAE-I (20) | | 172 | 216 | Single phase | 1.9 |
| 6 | A, C & D | PA6 (70); PHAE-I (30) | | 169 | 215 | Single phase | 1.5 |
| 7 | A, C & D | PA6 (50); PHAE-I (50) | | 156 | 197 | | |
| Control 5 | B | PA6/NC-II[8] (100) | | 178 | 220 | Single phase | |
| 8 | A, C & D | PA6/NC-II (70); PHAE-I (30) | | 166 | 213 | Single phase | 1.6 |
| 9 | A, C & D | PA6/NC-II (50); PHAE-I (50) | | 156 | 198 | Single phase | |
| Control 6 | B | PA 6I/6T (100) | 127 | — | — | — | 1 |
| 10 | A, C & D | PA6I/6T (80); PHAE-I (20) | 126 + 68 | — | — | 2-phase (immiscible) | |
| 11 | A, C & D | PA 6I/6T (70); PHAE-I (30) | 125 + 68 | — | — | 2-phase (immiscible) | |
| 12 | A, C & E | PA6 (47); PHAE-I (49) MAnh-g-PBD (3.5); Cobalt stearate[2] (0.1) | | 156 | 197 | Single phase matric with fine PBD dispersion | |
| 13 | A, C & E | PA6/NC-II (47); PHAE-I (49.4); MAnh-g-PBD (3.5); Cobalt stearate (0.1) | | 156 | 198 | 1-phase matrix + clay and PBD dispersion | |
| Control 7 | B | PA66 (100) | | 225 | 263 | — | |
| 14 | A & C | PA66 (70); PHAE-I (30) | | 225 | 251 | 2-phase | |
| Control 8 | B | PA12 (100) | | 146 | 179 | — | |
| 15 | A & C | PA12 (70); PHAE-I (30) | | 146 | 177 | 2-Phase | |
| Control 9 | B | PA-MXD6 (100) | | None | 236 | | |
| 16 | A & C | PA-MXD6 (70); PHAE-I (30) | | None | 229 | 2-Phase | |
| Control 10 | B | PHAE-II | 51 | | | | |
| 17 | A & C | PA6 (70); PHAE-II (30) | | 171 | 212 | Single phase | |
| 18 | A & C | PA6/NC-II (70); PHAE-II (30) | | 162 | 210 | Single phase | |
| 19 | A & C | PA6/NC-I (70); PHAE-II (30) | | 160 | 201 | Single phase | |

[1]Morphology of the blend examined by optical and transmission electron microscopy.
[2]Cobalt stearate provides about 100 ppm of cobalt ion as the catalyst for the oxygen scavenging reaction with PBD.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A polymeric composition comprising a single phase miscible blend of at least one polyamide component and at least one poly(hydroxyamino ether) component.

2. The composition of claim 1 wherein said polyamide component comprises at least one polyamide homopolymer.

3. The composition of claim 1 wherein said polyamide component comprises at least one polyamide copolymer.

4. The composition of claim 1 wherein said polyamide component comprises a combination of both a polyamide homopolymer and a polyamide copolymer.

5. The composition of claim 1 wherein said polyamide component comprises a polyamide selected from the group consisting of nylon 6, nylon 6,6, nylon 6/66, nylon 66/6, nylon 6I/6T and combinations thereof.

6. The composition of claim 1 wherein said polyamide component comprises nylon 6.

7. The composition of claim 1 wherein said polyamide component comprises a combination of nylon 6, and at least one of nylon 6I/6T; nylon MXDI/T and nylon 6/66.

8. The composition of claim 1 wherein said poly (hydroxyamino ether) component has repeating units represented by the formula:

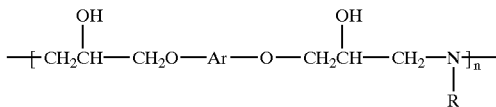

wherein Ar=p- or m-phenylene; alkyl substituted p- or m-phenylene; 4,4'-isopropylidene-bis-phenylene; or 4,4'-oxy-bis-phenylene;

R=alkyl; ω-hydroxyalkyl; aryl; o-, m- or p-hydroxyaryl ω-hydroxy-(polyalkyleneoxy) alkyl ; or ω-alkoxy-(polyalkyleneoxy)alkyl;

and n is an integer from about 5 to about 1000.

9. The composition of claim 1 wherein the said poly(hydroxyamino ether) is derived from a 1:1 polyaddition reaction of an aryldiglycidyl ether and monoethanolamine, represented by the formula:

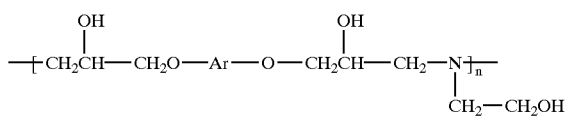

wherein Ar=p- or m-phenylene; alkyl substituted p- or m-phenylene; 4,4'-isopropylidene-bis-phenylene; or 4,4'-oxy-bis-phenylene;

and n is an integer from about 5 to about 1000.

10. The composition of claim 1 wherein said poly(hydroxyamino ether) component comprises a polyadduct of monoethanolamine with resorcinol diglycidyl ether or bisphenol A-diglycidyl ether or a combination thereof.

11. The composition of claim 1 further comprising at least one platelet type organoclay in nanometer scale fine dispersion.

12. The composition of claim 11 further comprising at least one oxidizable polydiene and at least one metal salt catalyst.

13. The composition of claim 11 wherein said polyamide component comprises a polyamide selected from the group consisting of nylon 6, nylon 6,6, nylon 6/66, nylon 66/6, nylon 6I/6T and combinations thereof.

14. The composition of claim 11 wherein said polyamide component comprises nylon 6.

15. The composition of claim 1 further comprising at least one oxidizable polydiene, or at least one metal salt catalyst, or both.

16. The composition of claim 1 further comprising at least one oxidizable polydiene.

17. The composition of claim 16 wherein said oxidizable polydiene comprises a polybutadiene.

18. The composition of claim 16 wherein said oxidizable polydiene comprises an epoxy or anhydride functional polybutadiene.

19. The composition of claim 16 wherein said oxidizable polydiene comprises particles which are substantially uniformly distributed in the polymeric composition.

20. The composition of claim 16 wherein the oxidizable polydiene comprises particles whose average particle size is in the range of from about 10 nm to about 5000 nm, and which particles are substantially uniformly distributed in the polymer composition.

21. The composition of claim 1 further comprising at least one metal salt catalyst.

22. The composition of claim 21 wherein said metal salt catalyst is a metal carboxylate salt.

23. The composition of claim 21 wherein said metal salt catalyst is selected from the group consisting of metal acetates, stearates, propionates, hexanoates, octanoates, benzoates, salicylates, cinnamates and combinations thereof.

24. The composition of claim 21 wherein said metal salt catalyst is selected from the group consisting of a cobalt, copper, ruthenium, acetate, stearate, propionate, hexanoate, octanoate, benzoate, salicylate or cinnamate, and combinations thereof.

25. The composition of claim 1 further comprising both at least one oxidizable polydiene and at least one metal salt catalyst.

26. The composition of claim 1 wherein said polyamide component comprises from about 1% to about 99% by weight of the blend, and said poly(hydroxyamino ether) component comprises from about 1% to about 99% by weight of the blend.

27. The composition of claim 1 further comprising a platelet type organoclay dispersed in nanometer-scale and both at least one oxidizable polydiene and at least one metal salt catalyst.

28. A polymeric film formed from the polymeric composition of claim 1.

29. The film of claim 28 wherein said polyamide component comprises both a polyamide homopolymer and a polyamide copolymer.

30. The film of claim 29 wherein said polyamide component comprises nylon 6.

31. The film of claim 29 wherein said polyamide component comprises a combination of nylon 6, and at least one of nylon 6I/6T, nylon MXDI/T and nylon 6/66.

32. The film of claim 28 which poly(hydroxyamino ether) component has repeating units represented by the formula:

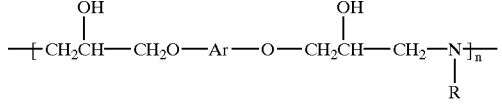

wherein Ar=p- or m-phenylene; alkyl substituted p- or m-phenylene; 4,4'-isopropylidene-bis-phenylene; or 4,4'-oxy-bis-phenylene;

R=alkyl; ω-hydroxyalkyl; aryl ; o-, m- or p-hydroxyaryl ω-hydroxy-(polyalkyleneoxy) alkyl; or ω-alkoxy-(polyalkyleneoxy)alkyl;

and n is an integer from about 5 to about 1000.

33. The film of claim 28 wherein said poly(hydroxyamino ether) component comprises a polyadduct of monoethanolamine with resorcinol diglycidyl ether or bisphenol A-diglycidyl ether or a combination thereof.

34. The film of claim 28 wherein said polyamide component comprises from about 50% to about 95% by weight of the blend, and said poly(hydroxyamino ether) component comprises from about 5% to about 50% by weight of the blend.

35. The film of claim 28 further comprising at least one oxidizable polydiene and at least one metal salt catalyst, or both.

36. The film of claim 28 further comprising at least one platelet type organoclay in nanometer scale fine dispersion.

37. A multilayer structure comprising at least one layer formed of the film of claim 28.

38. A shaped article comprising the polymeric composition of claim 1.

39. A polymeric composition comprising a single phase miscible blend of at least one polyamide component selected from the group consisting of nylon 6, nylon 6/66, nylon 6I/6T, and at least one poly(hydroxyamino ether) component.

40. A shaped article comprising the polymeric composition of claim 39.

41. A polymeric composition comprising a single phase miscible blend of a nylon component comprising nylon 6 and at least one poly(hydroxyamino ether) component.

42. The composition of claim 41 further comprising at least one oxidizable polydiene and at least one metal salt catalyst.

43. The composition of claim 42 further comprising at least one platelet type organoclay in nanometer scale fine dispersion.

44. A polymeric film formed from a polymeric composition of claim 43.

45. A shaped article comprising the polymeric composition of claim 41.

46. A polymeric composition comprising a blend of at least one polyamide component, at least one poly(hydroxyamino ether) component, and a metal salt catalyst.

47. The composition of claim 46 wherein said metal salt catalyst is a metal carboxylate salt.

48. The composition of claim 46 wherein said metal salt catalyst is selected from the group consisting of metal acetates, stearates, propionates, hexanoates, octanoates, benzoates, salicylates, cinnamates and combinations thereof.

* * * * *